US011552744B2

(12) United States Patent
Takeda et al.

(10) Patent No.: US 11,552,744 B2
(45) Date of Patent: Jan. 10, 2023

(54) USER TERMINAL, BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/637,162

(22) PCT Filed: Aug. 9, 2017

(86) PCT No.: PCT/JP2017/028981
§ 371 (c)(1),
(2) Date: Feb. 6, 2020

(87) PCT Pub. No.: WO2019/030869
PCT Pub. Date: Feb. 14, 2019

(65) Prior Publication Data
US 2020/0366425 A1    Nov. 19, 2020

(51) Int. Cl.
*H04L 1/18*    (2006.01)
*H04L 5/00*    (2006.01)
*H04W 72/12*    (2009.01)

(52) U.S. Cl.
CPC .......... *H04L 1/1854* (2013.01); *H04L 5/0007* (2013.01); *H04L 5/0055* (2013.01); *H04W 72/1273* (2013.01); *H04W 72/1289* (2013.01)

(58) Field of Classification Search
None
See application file for complete search history.

(56) References Cited

U.S. PATENT DOCUMENTS 10,171,220 B2 *  1/2019  Kusashima ........... H04L 1/1861
2013/0343313 A1  12/2013 Takeda et al.
(Continued)

FOREIGN PATENT DOCUMENTS

JP    2007-053588 A    3/2007
KR   20140131995 A    11/2014
(Continued)

OTHER PUBLICATIONS

International Search Report issued in PCT/JP2017/028981 dated Nov. 7, 2017 (2 pages).
(Continued)

*Primary Examiner* — Phirin Sam
(74) *Attorney, Agent, or Firm* — Osha Bergman Watanabe & Burton LLP

(57) ABSTRACT

To appropriately perform communication even in a case where a transmission timing/transmission period for retransmission control information is flexibly controlled (is variable), an aspect of a user terminal according to the present invention includes a transmitting section that transmits retransmission control information for DL transmission and a control section that controls transmission of the retransmission control information at certain timings reported from a base station. A time window is configured for the retransmission control information, the control section controls transmission of the retransmission control information, based on the certain timings and the time window configured for the retransmission control information, and at least one of the certain timings is included within a range of the time window.

5 Claims, 11 Drawing Sheets

(56) References Cited

U.S. PATENT DOCUMENTS

| | | | |
|---|---|---|---|
| 2014/0269453 A1* | 9/2014 | Papasakellariou | H04L 1/1854 370/280 |
| 2015/0009972 A1 | 1/2015 | Xu et al. | |
| 2015/0023269 A1* | 1/2015 | Lee | H04L 5/0055 370/329 |
| 2016/0218836 A1 | 7/2016 | Yamamoto et al. | |
| 2016/0323070 A1 | 11/2016 | Chen et al. | |
| 2017/0331611 A1 | 11/2017 | Stern-Berkowitz et al. | |
| 2018/0006791 A1* | 1/2018 | Marinier | H04L 1/1893 |
| 2018/0019843 A1* | 1/2018 | Papasakellariou | H04L 1/1896 |
| 2018/0034526 A1* | 2/2018 | Lee | H04B 7/0647 |
| 2018/0310257 A1* | 10/2018 | Papasakellariou | H04W 52/50 |
| 2019/0053318 A1* | 2/2019 | Nogami | H04L 5/0096 |
| 2020/0100139 A1* | 3/2020 | Kim | H04W 28/04 |
| 2020/0259594 A1* | 8/2020 | Takeda | H04L 1/1858 |
| 2021/0409174 A1* | 12/2021 | Yum | H04L 25/0202 |

FOREIGN PATENT DOCUMENTS

| | | |
|---|---|---|
| KR | 20150060876 A | 6/2015 |
| WO | 2015/114700 A1 | 8/2015 |

OTHER PUBLICATIONS

Written Opinion of the International Searching Authority issued in PCT/JP2017/028981 dated Nov. 7, 2017 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Patent Application No. 17920797.2, dated Feb. 15, 2021 (10 pages).

Nokia, Alcatel-Lucent Shanghai Bell; "On HARQ feedback determination"; 3GPP TSG RAN WG1 NR Ad-Hoc #2, R1-1710999; Qingdao, P.R. China, Jun. 27-30, 2017 (5 pages).

Samsung; "HARQ-ACK codebook determination"; 3GPP TSG RAN WG1 NR Ad-Hoc#2, R1-1710729; Qingdao, P.R. China; Jun. 27-30, 2017 (4 pages).

LG Electronics; "Consideration on HARQ-ACK feedback timing for NR"; 3GPP TSG RAN WG1 Meeting NR Ad-Hoc#2, R1-1710332; Qingdao, P.R. China, Jun. 27-30, 2017 (5 pages).

Office Action issued in counterpart Chile Patent Application No. 202000342 dated Jul. 14, 2021 (20 pages).

CATT; "Explicit HARQ and scheduling timing design for LTE sTTI"; 3GPP TSG RAN WG1 Meeting #86bis, R1-1610444; Lisbon, Portugal, Oct. 10-14, 2016, (3 pages).

LG Electronics; "Consideration on aggregated HARQ-ACK feedback for NR"; 3GPP TSG RAN WG1 Meeting #89, R1-1707657; Hangzhou, P.R. China, May 15-19, 2017 (4 pages).

Samsung; "HARQ-ACK codebook determination"; 3GPP TSG RAN WG1 Meeting #89, R1-1708025; Hangzhou, P.R. China, May 15-19, 2017 (4 pages).

Office Action issued in counterpart Japanese Patent Application No. 2019-535516 dated Oct. 5, 2021 (9 pages).

Office Action issued in Korean Application No. 10-2020-7004618; dated Jan. 25, 2022 (8 pages).

Office Action issued in Chinese Application No. 201780095552.7; dated Mar. 1, 2022 (13 pages).

Office Action issued in Indian Application No. 202037005336; dated Mar. 8, 2022 (5 pages).

Office Action issued in European Application No. 17920797.2; dated Mar. 21, 2022 (6 pages).

Office Action issued in Chilean Application No. 202000342 dated Apr. 5, 2022 (33 pages).

Office Action issued in Korean Application No. 10-2020-7004618, dated Aug. 18, 2022 (7 pages).

\* cited by examiner

USER TERMINAL, BASE STATION AND RADIO COMMUNICATION METHOD

TECHNICAL FIELD

The present invention relates to a user terminal, a base station, and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further increasing bandwidth and speed compared to LTE, a successor system of LTE (also referred to as, for example, LTE-A (LTE-Advanced), FRA (Future Radio Access), 4G, 5G, 5G+ (plus), NR (New RAT), LTE Rel. 14, Rel. 15 (or later versions), and so on) is under study.

In the existing LTE systems (for example, LTE Rel. 13 or earlier versions), communication of a downlink (DL) and/or an uplink (UL) is performed by using a transmission time interval (TTI) (also referred to as a subframe and so on) of 1 ms. The TTI of 1 ms is a transmission time unit of one channel-coded data packet, and is a processing unit of scheduling, link adaptation, retransmission control (HARQ-ACK (Hybrid Automatic Repeat reQuest-Acknowledge)), and so on. The TTI of 1 ms includes two slots.

In the existing LTE systems, a reference value for transmission timings is assumed to be fixed at 4 ms taking into account, for example, a signal processing time at a user terminal and/or a radio base station, and on this assumption, control is performed on transmission timings for retransmission control information (also referred to as, for example, ACK/NACK, A/N, HARQ-ACK, and so on) for a DL shared channel (for example, a PDSCH (Physical Downlink Shared Channel), hereinafter referred to as a PDSCH).

For example, FDD for the existing LTE systems, in a case where the PDSCH (or DL data) is received in subframe #n, an A/N for the PDSCH is transmitted (fed back) in subframe #n+4 on the assumption that the processing time or the like for the PDSCH at the user terminal is 4 ms. In TDD, in a case where the PDSCH is received in DL subframe #n, the A/N for the PDSCH is transmitted in a UL subframe after subframe #n+4 according to UL/DL configurations and so on, on the assumption that, for example, the processing time for the PDSCH at the user terminal is 4 ms.

In the existing LTE systems, the user terminal uses a UL data channel (for example, a PUSCH (Physical Uplink Shared Channel) and/or UL control channel (for example, a PUCCH (Physical Uplink Control Channel) to transmit uplink control information (USI) including A/Ns and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For a future radio communication system (for example, LTE Rel. 14 and later versions, 5G, NR, or the like), flexible control of scheduling of a data channel (including a DL data channel and/or a UL data channel, and simply referred to as data and so on) is under study. For example, study is conducted on making a transmission timing and/or a transmission period for data (hereinafter also referred to as the "transmission timing/transmission period") variable for each scheduling (variable length). Study is also conducted on making an A/N transmission timing/transmission period for data transmission variable for each A/N transmission.

In the existing LTE systems, A/N feedback is controlled, based on pre-defined transmission timings. In a radio communication system that can vary the transmission timing for each A/N transmission, controlling the A/N transmission (for example, multiplexing and so on) as is the case with the existing LTE systems may prevent flexible control of each A/N transmission, leading to degraded communication quality.

The present invention has been made in view of the above, and it is an object of the present invention to provide a user terminal, a base station, and a radio communication method capable of performing communication appropriately even in a case where the transmission timing/transmission period for the retransmission control information is flexibly controlled (is variable).

Solution to Problem

An aspect of a user terminal according to the present invention includes a transmitting section that transmits retransmission control information for DL transmission and a control section that controls transmission of the retransmission control information at certain timings reported from a base station. A time window is configured for the retransmission control information, the control section controls transmission of the retransmission control information, based on the certain timings and the time window configured for the retransmission control information, and at least one of the certain timings is included within a range of the time window.

Advantageous Effects of Invention

According to the present invention, communication can be appropriately performed even in a case where the transmission timing/transmission period for retransmission control information is flexibly controlled (is variable).

DESCRIPTION OF EMBODIMENTS

Figure 1:
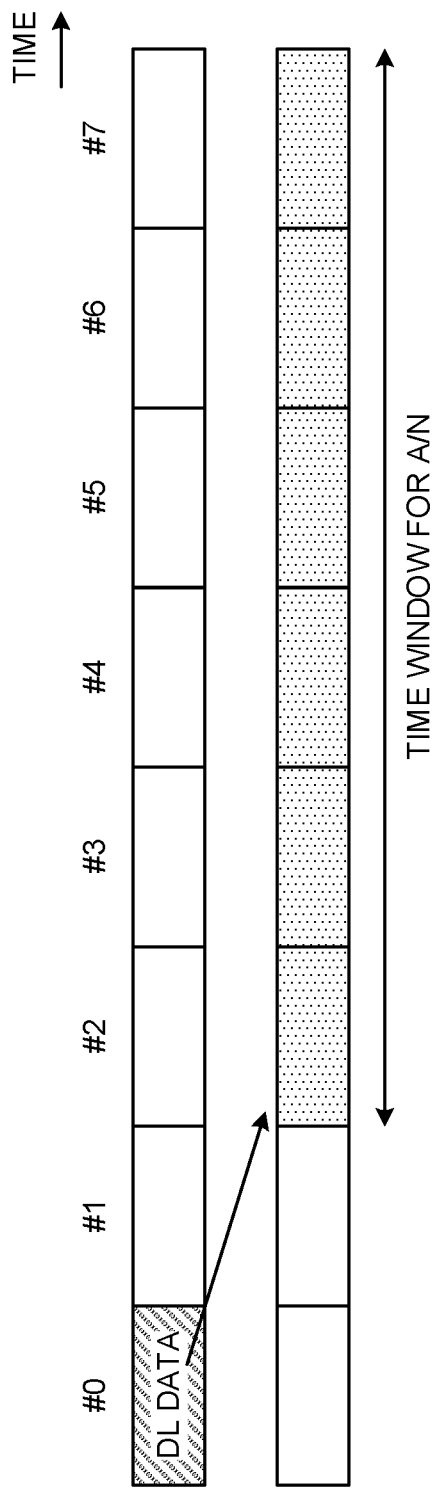
FIG. 1 is a diagram to show an example of a time window configured for A/Ns for DL data.

For a future radio communication system (for example, LTE Rel. 14 and later versions, 5G, NR, or the like), study is conducted on utilization of a time unit with a variable time length (for example, at least one of a slot, a mini-slot, and a certain number of symbols) as a scheduling unit for a data channel (including a DL data channel and/or a UL data channel, and simply referred to as data or the like).

Here, the slot is a time unit based on numerology applied to a user terminal (for example, a subcarrier spacing and/or a symbol length). The number of symbols per slot may be specified according to the subcarrier spacing. For example, in a case where the subcarrier spacing is 15 kHz or 30 kHz, the number of symbols per slot may be 7 or 14. On the other hand, in a case where the subcarrier spacing is equal to or higher than 60 kHz, the number of symbols per slot may be 14.

The subcarrier spacing and a symbol length are in a reciprocal relationship. Thus, with the same number of symbols per slot, a slot length decreases with increasing (wider) subcarrier spacing and a slot length increases with decreasing (narrower) subcarrier spacing.

The mini-slot is a time unit shorter than the slot. The mini-slot may be constituted of symbols the number of which is smaller than the number of the slots (for example, one to (slot length−1) symbols, by way of example, two or three symbols). The same numerology as that for the slot (for example, the subcarrier spacing and/or symbol length) or numerology different from that for the slot (for example, a subcarrier spacing higher than that for the slot and/or a symbol length shorter than that for the slot) may be applied to the mini-slots in the slot.

In the future radio communication system, with possible introduction of a time unit different from that for the existing LTE systems, a plurality of time units are assumed to be applied to scheduling of data and so on to control transmission and/or reception (or allocation or the like) of signals and/or channels. In a case where different time units are used to schedule data or the like, a plurality of data transmission periods/transmission timings or the like may be created. For example, a user terminal supporting a plurality of time units performs transmission and/or reception of data scheduled in the different time units.

By way of example, scheduling in a first time unit (for example, a slot unit) (slot-based scheduling) and scheduling in a second time unit shorter than the first time unit (for example, a non-slot unit) (non-slot-based scheduling) may be adopted. The non-slot unit may be a mini-slot unit or a symbol unit. Note that the slot can be constituted of, for example, 7 or 14 symbols and that the mini-slot can be constituted of one to (slot length−1) symbols.

In this case, the transmission timing/transmission period for data in a time direction varies depending on the data scheduling unit. For example, in a case where scheduling is performed in units of slots, one data is allocated to one slot. On the other hand, in a case where scheduling is performed in units of non-slots (units of mini-slots or symbols), data is selectively allocated to a partial region of one slot. Thus, in a case where scheduling is performed in units of non-slots, a plurality of data can be allocated to one slot.

In the future radio communication system, the transmission timing/transmission period for data or the like is assumed to be made variable for each scheduling (transmission) to flexibly control scheduling of data or the like. For example, in the non-slot-based scheduling, data (for example, the PDSCH and/or PUSCH) is allocated over a certain number of symbols for each scheduling such that an allocation position starts at any symbol.

As is the case with the data (for example, the PDSCH and/or PUSCH) for which the transmission timing/transmission period is variably controlled, for UCI (for example, A/Ns) for the data, the transmission timing/transmission period is assumed to be made variable for each transmission. For example, a base station utilizes downlink control information and/or higher layer signaling or the like to specify (report) an A/N transmission timing/transmission period for (to) a UE. In this case, an A/N transmission timing (feedback timing) corresponding to each data is flexibly configured.

As described above, in the future radio communication system, the A/N transmission timing or the like for each DL transmission (DL data and/or PDSCH) is assumed to vary for each A/N. In such a case, it is difficult to directly employ a control method (for example, multiplexing, a codebook size, and so on) for an existing LTE system (for example, Rel. 8 to Rel. 13) that controls A/N feedback, based on predefined transmission timings.

In the future radio communication system, a transmission direction (UL transmission or DL transmission) is assumed to be flexibly switched in certain time units for control. For example, it is assumed that the transmission direction (DL transmission or UL transmission) is varied in certain time units (for example, in slots) for control. In this case, in a case where enabling A/N transmission for each DL transmission is limited to a single timing (slot), the A/N transmission (or switching of the transmission direction) may fail to be flexibly controlled.

Thus, the inventors of the present invention have focused on the point that the A/N transmission or the like can be flexibly controlled by providing a plurality of timings when transmission is enabled for one A/N generated for each DL transmission (DL data and/or PDSCH), and come up with the idea of configuring a time window for each A/N and controlling the transmission (feedback) of the A/N, based on the A/N transmission timing and the A/N time window.

Embodiments according to the present invention will be described in detail with reference to the drawings as follows. Configurations according to aspects may be adopted independently or in combination. Note that the A/N feedback for the DL data and/or the PDSCH will hereinafter be described by way of example but that the present embodiment can be applied to any configuration as long as the configuration flexibly controls the transmission timing (makes the transmission timing variable).

(First Aspect)

In a first aspect, a time window is configured for A/Ns for DL transmission (for example, DL data and/or PDSCH) to control A/N transmission (feedback). The time window configured for A/Ns (or DL data) may be referred to as an A/N transmission window, an A/N transmission candidate period, a candidate A/N timing, and so on.

The user terminal (UE) performs A/N feedback for each DL transmission. For example, the UE performs the A/N feedback for the DL data transmitted in certain time units. Note that the time unit may be a period constituted of a slot, a mini-slot, or a certain number of symbols. The following description takes the slot as an example of the time unit. However, the present embodiment is not limited to the example.

The UE can judge the transmission direction for each slot (UL/DL transmission direction), based on a report (indication) from the base station. The transmission direction includes DL, UL, or other (for example, Unknown). Information related to the transmission direction may be reported to the UE as information related to a slot configuration.

In a case where the other (for example, Unknown) is reported, the UE may perform neither UL transmission nor DL transmission. In other words, in a case where the other (Unknown) is reported, the user terminal does not expect anything (for example, control and/or operation related to transmission and/or reception) about a certain slot (or a certain time and/or frequency resource in the slot). The certain time/frequency resource is provided for forward compatibility, for example. The certain time/frequency resource is also referred to as an Unknown resource, a reserved resource, a blank resource, an unused resource, a first time/frequency resource, or the like.

The Unknown resource may be indicated by information (format related information, hereinafter also referred to as slot format related information (SFI) or the like) related to a format of a time unit (for example, at least one of one or more slots, one or more mini-slots, and one or more symbols) in which the data channel is scheduled. The SFI may indicate, as a format of the time unit, at least one of the time/frequency resource reserved as an Unknown resource, the number of symbols in the time unit, and symbols for the DL (DL symbols) in the time unit and/or symbols for the UL (UL symbols) in the time unit. One or more candidates for the format indicated by the SFI may be predefined in specifications or configured by higher layer signaling.

The SFI may be included in downlink control information (also referred to as group common DCI, first DCI, or the like) common to a group including one or more user terminals. Alternatively, the SFI may be included in other control information reported through physical layer signaling or in control information reported through higher layer signaling.

For example, the base station semi-statically configures, for the UE, the transmission direction in each slot through higher layer signaling (option 1). Alternatively, the base station may dynamically configure, for the UE, the transmission direction in each slot through physical layer signaling (for example, downlink control information) (option 2). A method for reporting (configuring) the UL/DL transmission period may involve application of one of options 1 and 2 or switching between options 1 and 2 for application. The information related to the transmission direction may be included and transmitted in information commonly received by a plurality of UEs.

The base station reports, to the UE (configures, for the UE), the A/N transmission (feedback) timings for data. For example, the base station semi-statically configures, for the UE, the A/N transmission timings for DL data through higher layer signaling (option 3). Alternatively, the base station may dynamically report, to the UE, the A/N transmission timings for DL data through physical layer signaling (for example, downlink control information) (option 4). A method for reporting (configuring) the A/N transmission timings may involve application of one of options 3 and 4 or switching between options 3 and 4 for application.

Option 1 and/or option 2 may be combined with option 3 for application, or option 1 and/or option 2 may be combined with option 4 for application. A configuration illustrated below can be suitably applied to option 4 (or the combination with option 1 and/or option 2). However, no such limitation is intended.

FIG. 1 shows an example in which a time window is configured for A/Ns for certain time units (for example, slots). Here, a case is illustrated in which a time window for slots #2 to #7 is configured for an A/N for DL data transmitted in slot #0. Note that the time window may be configured for a plurality of consecutive slots or for a plurality of non-consecutive slots. The time window may be configured for one or more slots. The time window may be extended, based on a certain condition (for example, a case in which the A/N transmission has failed, and so on).

Figure 2:
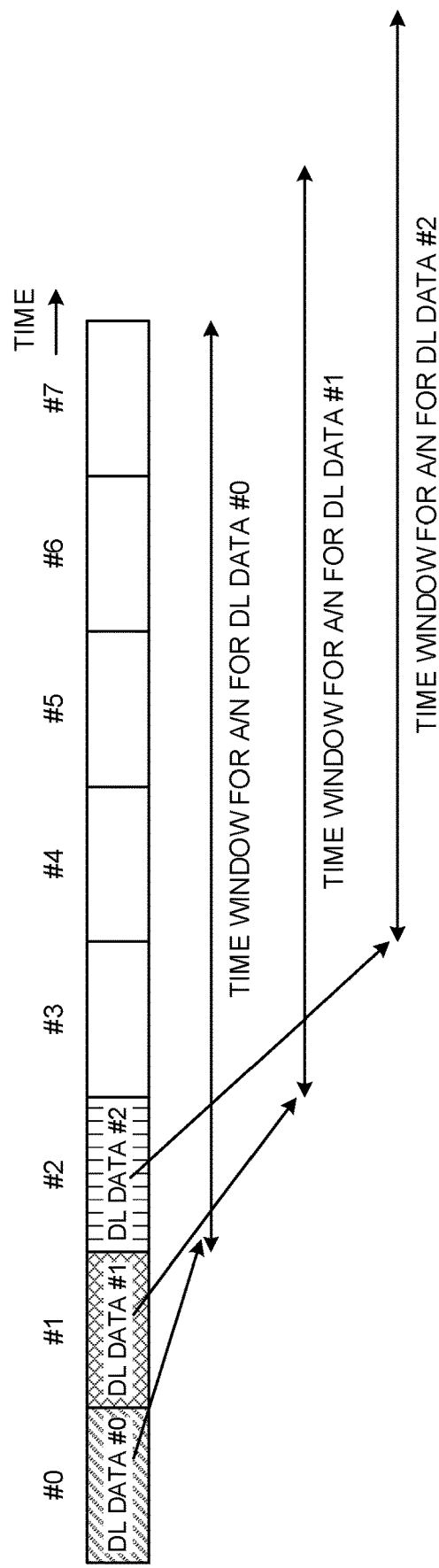
FIG. 2 is a diagram to show an example of time windows each configured for a corresponding one of A/Ns for a plurality of DL data.

The time window may be configured for each A/N corresponding to DL data in time units (for example, slots) with different transmission timings (see FIG. 2). For example, the time window is configured for each of different slots. In FIG. 2, the time window is configured for each of an A/N for DL data #0 transmitted in slot #0, an A/N for DL data #1 transmitted in slot #1, and an A/N for DL data #2 transmitted in slot #2.

The time windows configured for respective A/Ns for DL data with different transmission timings may have different configured positions and/or periods or the same configured position and/or period. FIG. 2 shows a case in which, for DL data #0 to #2, the time window for A/Ns varies in position (configured slot indexes) but is identical in size (here, six slots).

In a case where a reported A/N transmission timing (or a UL transmission indication) is included within the range of the time window, the UE multiplexes A/N bits in DL data associated with (corresponding to) the time window and performs A/N transmission. In other words, the UE multiplexes, on a UL channel (for example, PUCCH or PUSCH), the A/N associated with the time window including the A/N transmission timing (certain slot) and transmits the UL channel.

In a case where the time window is configured for each of the A/Ns for the respective DL transmissions (DL data #0 to #2 in FIG. 2), the UE transmits one or more A/Ns at certain timings, based on the A/N transmission timing and the time window configured for each A/N.

For example, in FIG. 2, a case is assumed in which the A/N transmission timing reported from the base station corresponds to slot #3 (reporting is also referred to as scheduling or trigger). In such a case, the A/N transmission timing is included within the ranges of the time window for the A/N for DL data #0 and the time window for the A/N for DL data #1. In this case, in slot #3, the UE multiplexes the A/N for DL data #0 and the A/N for DL data #1 and transmits a multiplexing result.

In FIG. 2, a case is assumed in which the A/N transmission timing reported from the base station corresponds to slot #4. In such a case, the A/N transmission timing is included within the ranges of the time window for the A/N for DL data #0, the time window for the A/N for DL data #1, and the time window for the A/N for DL data #2. In this case, in slot #4, the UE multiplexes the A/N for DL data #0, the A/N for DL data #1, and the A/N for DL data #2 and transmits a multiplexing result.

As described above, in a case where the A/N transmission timing is included in the time window, the A/N constituting the time window is multiplexed on the UL channel, which is then transmitted. Note that a plurality of A/N transmission timings for one time window (for example, in a case where A/N transmission is indicated to be performed in a plurality of slots in the time window), the UE may repeatedly transmit the A/N corresponding to the time window at each transmission timing (in a plurality of slots).

The time window is configured for each A/N, and in a case where the A/N transmission timing is included in the time window, the A/N transmission corresponding to the time window is performed. Then, A/Ns for a plurality of DL data can be transmitted by utilizing a common (for example, one) A/N transmission timing. Accordingly, compared to a case in which the timing when the A/N can be transmitted is limited to a single timing, the present configuration can flexibly configure the transmission timing for each A/N and reduce A/N transmissions with respect to the number of DL transmissions. As a result, even in a case where no UL transmission is configured in each slot, the A/N feedback can be flexibly controlled by indicating A/N transmission at certain timings in the time window.

For the A/N feedback for DL data transmitted in each slot, at least one A/N transmission timing (or the slot in which the UL transmission is performed) needs to be included within the range of the time window configured for each A/N. Thus, the base station may indicate the A/N transmission such that at least one A/N transmission timing is included within the range of the time window configured for the A/N for the DL data transmitted in each slot (the indication is also referred to as scheduling or trigger).

The UE may control the UL transmission on the assumption that at least one A/N transmission timing is included within the range of the time window configured for the A/N for the DL data transmitted in each slot. Note that the A/N transmission timing indicated by the base station may be information indicating the slot for which the UL transmission (or the PUCCH) is configured. For example, in a case of receiving, from the base station, information indicating the slot for which the UL transmission (or the PUCCH) is configured, the UE may be configured to perform the A/N transmission in the slot.

The time window configured for the A/N may be reported from the base station to the UE (configured by the base station for the UE). For example, information related to the time window configured for the A/N may be reported to the UE by utilizing physical layer signaling (for example, downlink control information) and/or higher layer signaling.

The base station may report, to the UE, offset information related to an offset from a reference position to a start timing for the time window and information related to the period (size) of the time window. The reference position may be the slot in which the DL data is transmitted or the slot in which DCI used to schedule the DL data is transmitted.

For example, in a case illustrated in FIG. 1, the base station reports the offset between a start slot (here, #2) for the time window and the slot (here, #0) for which the DL data is scheduled and/or the slot in which the DCI used to schedule the DL data is transmitted. The base station reports, to the UE, information (here, six slots) related to the period (size) of the time window. Information about the time window may be reported (configured) individually or commonly for the A/Ns for different DL data.

The offset may be configured with processing time capability of the UE taken into account. For example, the offset is configured to be larger than a minimum value of the processing time capability of the UE. Accordingly, the time window can be configured with the capability of each UE taken into account. Note that the offset and/or the size of the time window may have a fixed value.

Alternatively, the UE may utilize a predefined equation to judge (for example, calculate) the time window for the A/N for each DL data. For example, a part of parameter information included in the equation may be reported to the UE through physical layer signaling and/or higher layer signaling, and the UE may judge the time window, based on the reported information.

Figure 3:
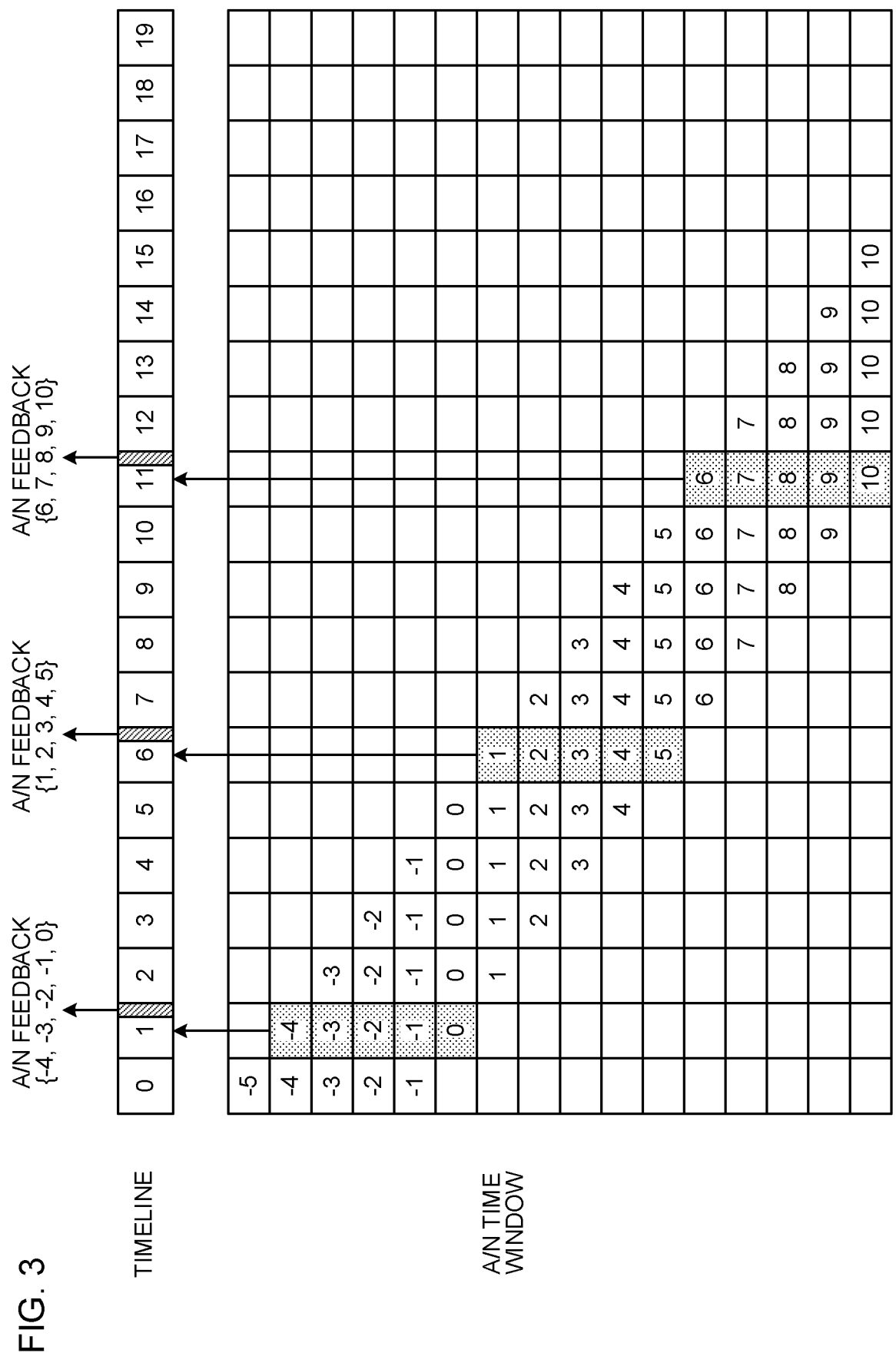
FIG. 3 is a diagram to show an example of A/N feedback control utilizing time windows configured for respective A/Ns.
Figure 4:
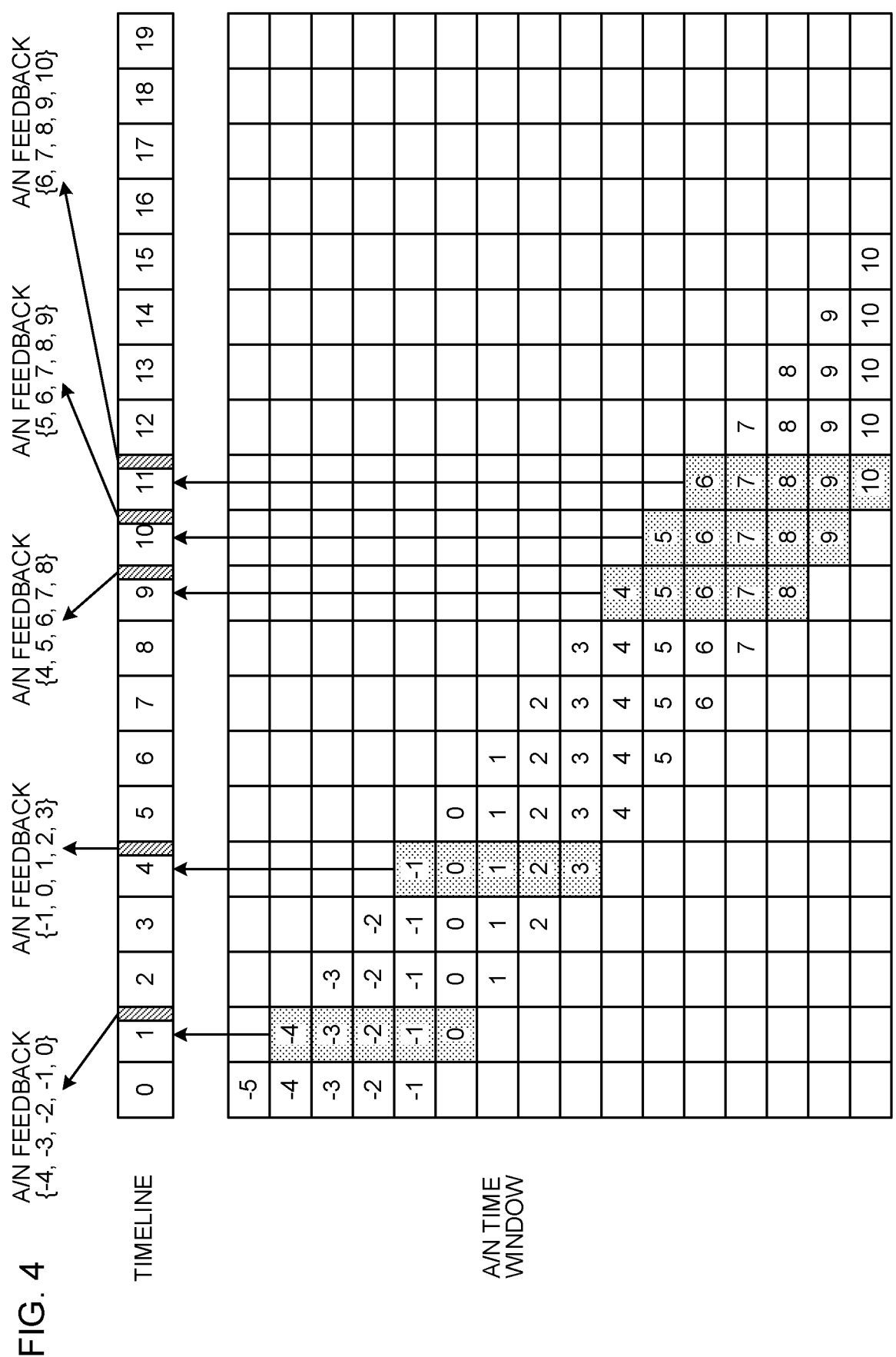
FIG. 4 is a diagram to show another example of A/N feedback control utilizing time windows configured for respective A/Ns.

With reference to FIG. 3 and FIG. 4, an example will be specifically described below in which the A/N feedback is controlled, based on the time window configured for the A/N for each DL data and the A/N transmission timing.

FIG. 3 shows a case in which the A/N transmission timing is configured on certain timelines (here, in slots #1, #6, and #11). FIG. 4 shows a case in which the A/N transmission timing is configured on certain timelines (here, in slots #1, #4, and #9 to #11). Note that the information related to the A/N transmission timing is reported from the base station to the UE.

FIG. 3 and FIG. 4 show cases where the time window for the A/N for each DL data is configured for a certain period (here, five slots) starting with a slot subsequent to the slot in which the DL data (or the DCI used to schedule the DL data) is transmitted. Of course, the position and/or size of the time window are not limited to this configuration.

For example, in FIG. 3, the time window for the A/N for the DL data transmitted in slot #0 is configured for slots #1 to #5. Similarly, the time window for the A/N for the DL data transmitted in slot #1 is configured for slots #2 to #6.

Slot #1 corresponding to the A/N transmission timing is included in the time windows for the A/N for the DL data transmitted in respective slots #−4, #−3, #−2, #−1, and #0. Thus, in the A/N transmission in slot #1, the UE multiplexes the A/Ns for the DL data transmitted in each of slots #−4, #−3, #−2, #−1, and #0 and transmits a multiplexing result. Similarly, in the A/N transmission in slot #6, the UE multiplexes the A/Ns for the DL data in each of slots #1, #2, #3, #4, and #5 and transmits a multiplexing result. In the A/N transmission in slot #11, the UE multiplexes the A/Ns for the DL data in each of slots #6, #7, #8, #9, and #10 and transmits a multiplexing result.

FIG. 3 shows a case where the A/N transmission timings are configured to prevent overlapping of the A/N transmissions for the DL data in the slots. In this case, the number of A/N transmissions can be reduced as much as possible. Of course, as shown in FIG. 4, the A/N transmission timings may be configured such that the A/N transmission for at least a part of the DL data is repeatedly performed.

In FIG. 4, slot #4 corresponding to the A/N transmission timing is included in the time window for the A/N for the DL data transmitted in each of slots #−1, #0, #1, #2, and #3. Thus, in the A/N transmission in slot #4, the UE multiplexes the A/Ns for the DL data transmitted in each of slots #−1, #0, #1, #2, and #3 and transmits a multiplexing result. The A/N for the DL data transmitted in slots #−1 and #0 is also transmitted in slot #1, and thus the UE repeatedly transmits uplink control information including the same A/N contents.

Similarly, in the A/N transmission in slot #9, the UE multiplexes the A/Ns for the DL data in each of slots #4, #5, #6, #7, and #8 and transmits a multiplexing result. In the A/N transmission in slot #10, the UE multiplexes the A/Ns for the DL data in each of slots #5, #6, #7, #8, and #9 and transmits a multiplexing result. In the A/N transmission in slot #11, the UE multiplexes the A/Ns for the DL data in each of slots #6, #7, #8, #9, and #10 and transmits a multiplexing result.

In this case, the UE transmits twice the A/N for the DL data transmitted in slots #5 ad #9, and transmits three times the A/N for the DL data transmitted in slots #6, #7, and #8. In this manner, feeding back the A/N for the same DL data multiple times allows demodulation performance for the A/N to be improved.

As described above, in the first aspect, the time window is configured for each A/N, and the A/N transmission is controlled by utilizing the A/N transmission timing configured within the range of the time window. Accordingly, compared to a case in which the transmission period for each A/N is limited to a single transmission period, the first aspect can flexibly control the A/N feedback timing.

(Second Aspect)

In a second aspect, an A/N codebook will be described that is used to configure a time window for an A/N to control A/N transmission.

The UE uses a certain bit size to transmit an A/N. The bit size utilized for A/N transmission is referred to as an A/N codebook, a codebook size, A/N bits, or an A/N bit sequence. To perform an appropriate receiving process (for example, decoding and so on) by the base station for an A/N transmitted from the UE, the base station needs to recognize the codebook size applied to the A/N transmission by the UE.

Thus, in the second aspect, the following will be described: a case where the codebook size applied to the A/N transmission is fixedly configured (case 1) and a case where the codebook size is configured (made variable) depending on scheduling of DL data (case 2).

<Case 1>

In a certain time unit (for example, a certain slot), the UE generates A/N bits for the slot regardless of whether DL data is scheduled for the slot. For example, in FIG. 3, in each slot, A/N bits for the slot are generated regardless of whether DL data is scheduled for each slot. In other words, the UE generates, in each slot, A/N bits regardless of whether DL data has been received. Note that the target (slots) for which A/N bits are generated may be all slots or may be limited to slots for which DL transmission is configured/reported.

In a case where the target (slots) for which A/N bits are generated is all slots, the A/N codebook transmitted by the UE constantly has the same size. In a case where the target (slots) for which A/N bits are generated is limited to the slots for which DL transmission is configured/reported, the A/N codebook transmitted by the UE varies depending on the pattern of the configured/reported DL slots or the like, but the base station and the terminal can have a common recognition of the codebook regardless of whether an error occurs in detection of DCI used to schedule DL data.

An A/N transmission timing in FIG. 3 (for example, slot #6) involves a time window for an A/N for DL data in slots #1 to #5. In this case, A/N bits are generated for slots #1 to #5 regardless of whether DL data is scheduled for (or received in) slots #1 to #5. In other words, the size of A/N bits generated at an A/N transmission timing (for example, slot #6) is determined, based on the number of A/Ns constituting the time window including the transmission timing.

As described above, in case 1, the A/N transmission is performed with a fixed codebook size applied at the A/N transmission timings (for example, slots #1, #6, and #11 in FIG. 3), regardless of whether the DL data is received in each slot. This allows the transmission to be achieved by application of the fixed codebook size even in a case where the UE makes an erroneous detection on a DL signal (DL data and/or DCI used to schedule the DL data) in any slot. As a result, the UE and the base station can have the same recognition of the codebook size, allowing the base station to appropriately achieve the receiving process.

In a case of failing to detect downlink control information (for example, DL assignment) used to schedule the DL data in a certain slot, the UE generates a NACK for the slot. In a case of failing to detect DCI used to schedule the DL data in slot #0 (for example, the DCI detected in the same slot #0), the UE judges the A/N for the DL data in slot #0 to be a NACK and generates A/N bits.

In a case of failing to detect, in a certain slot, downlink control information (for example, DL assignment) used to schedule DL data, the UE generates a NACK for the slot for which the DL data is scheduled. In a case of failing to detect, in slot #0, DCI used to schedule the DL data in a certain slot (slot after #0), the UE judges the A/N for the certain slot to be a NACK and generates A/N bits. In a case where cross slot scheduling is adopted, DL data and DCI used to schedule the DL data are allocated to different slots, and thus, a NACK may be judged in consideration of the slot for the DL data as described above.

<Case 2>

In a certain time unit (for example, a certain slot), the UE generates A/N bits for the slot depending on whether DL data is scheduled for the slot. For example, in FIG. 3, in a case where DL data is scheduled for a certain slot (for example, slot #0), A/N bits for slot #0 are generated. On the other hand, in a case where no DL data is scheduled for slot #0, no A/N bits are generated for slot #0.

In this case, the UE determines, at the A/N transmission timing (in the A/N transmission slot), the codebook size to be applied to the A/N transmission in consideration of the slot for which the DL data is actually scheduled.

The A/N transmission timing in FIG. 3 (for example, slot #6) involves a time window for an A/N for DL data in slots #1 to #5. In this case, the UE controls generation of A/N bits for the DL data in slots #1 to #5 and the codebook size by considering whether DL data is scheduled for each of slots #1 to #5.

For example, in slots #1 to #5, in a case where DL data is scheduled for slots #2, #4, and #5, an A/N is generated for each of the DL data in slots #2, #4, and #5 and the codebook size is determined. In other words, the size of A/N bits generated at an A/N transmission timing is determined, based on the number of A/Ns for which the corresponding DL data is actually scheduled, the A/Ns being included in the A/Ns corresponding to the time window including the transmission timing.

Note that whether DL data is scheduled for each slot can be judged by, for example, utilizing DL DAI (Downlink Assignment Index) included in the DCI used to schedule the DL data. In other words, the UE may judge misdetection of the PDCCH (or DCI) in each slot, based on the DL DAI. The DL DAI may be constituted of a total DAI indicating the total number of DL data scheduled for a certain period and a counter DAI indicating a cumulative value for scheduled DL data or exclusively of the counter DAI.

<A/N Bit Position>

As described above, in a case where a plurality of A/N transmissions are performed with a time window configured for each A/N, the problem is how to control A/N bit positions (multiplexing positions). Thus, a case will be described below in which A/N bit positions (HARQ-ACK bit positions) are controlled, based on a method for configuring the codebook size (case 1 or case 2).

In a case where the codebook size is fixedly configured (case 1), the order of A/N bits (order of multiplexing) is controlled, based on the slot number (slot index) of DL data corresponding to each A/N. In other words, the bits of the A/N are allocated in order of increasing slot number of the slot in which the DL data from which the A/N is generated is transmitted.

For example, for an A/N transmission timing in FIG. 3 (for example, slot #6), the A/Ns for the DL data in slots #1 to #5 are assumed to be transmitted. In such a case, the A/N for the DL data for slot #1 is set as a leading A/N, and the A/Ns for the DL data in slots #2 to #5 are subsequently multiplexed in order. As described above, by controlling the positions of the A/N bits, based on the slot numbers of the DL data, the A/Ns can be allocated in order of generation starting with the A/N generated earliest. This enables suppression of a possible delay in generation of A/N bits.

In a case where the codebook size is configured (made variable) depending on the scheduling of the DL data (case 2), the order of the A/N bits may be controlled, based on the order of transmission of the DL data to be scheduled (or the order of reception). The order of transmission of the DL data to be scheduled may be interpreted as the order of the DL DAI (for example, the counter DAI). In other words, the UE determines the order of allocation of the A/Ns, based on the DL DAI. This enables the A/Ns for the DL data to be allocated in order starting with the A/N for the DL data with the earliest schedule, allowing suppression of a possible delay in generation of A/N bits.

Note that, in A/N feedback for semi-persistent scheduling (DL SPS), the A/N bits for the DL data to which the DL SPS is applied may be allocated to a leading or a final bit region.

In a case where the DL SPS is adopted, the DL data transmitted in each slot is not scheduled by using the DCI. Thus, the UE fails to determine, by using the DL DAI included in the DCI, the order of transmission of the DL data to which the DL SPS is applied. Accordingly, the A/N bits in the DL data to which the DL SPS is applied are allocated to the leading or final bit region of a bit sequence to be transmitted. Thus, the A/N for the DL data to which the DL SPS is applied can be appropriately multiplexed with the A/N for the DL data to be scheduled, and a multiplexing result can be transmitted.

(Third Aspect)

In a third aspect, A/N transmission control will be described that is used in a case where an A/N fails to be transmitted by using the time window configured for the A/N.

Depending on a communication environment, there may be a case in which the UE fails to transmit an A/N within the range of the time window configured for the A/N. For example, in an unlicensed band, listening is implemented before UL transmission (listen-before-talk (LBT)). With the listening idle, UL transmission is allowed, and with the listening busy, the UL transmission is restricted. Accordingly, at an A/N transmission timing (for example, a certain slot) reported from the base station, in a case where the listening implemented before the UL transmission (A/N transmission) is busy, the A/N may fail to be transmitted in the certain slot and consequently fail to be transmitted within the time window.

Alternatively, in some cases, the base station may not indicate (or schedule or trigger) the transmission timing for the A/N for the DL data to be configured within the time window. For example, in a case where a DL resource time section is extended for another user communicating on the same carrier or for an operated service and a UL resource configuration period is extended, the A/N transmission timing may be excluded from the time window range.

Thus, in the present aspect, in a case where the A/N fails to be transmitted within the configured time window range, control is provided such that the A/N transmission is performed by utilizing the timing when the UE can transmit the A/N earliest after the elapse of the time window.

Figure 5:
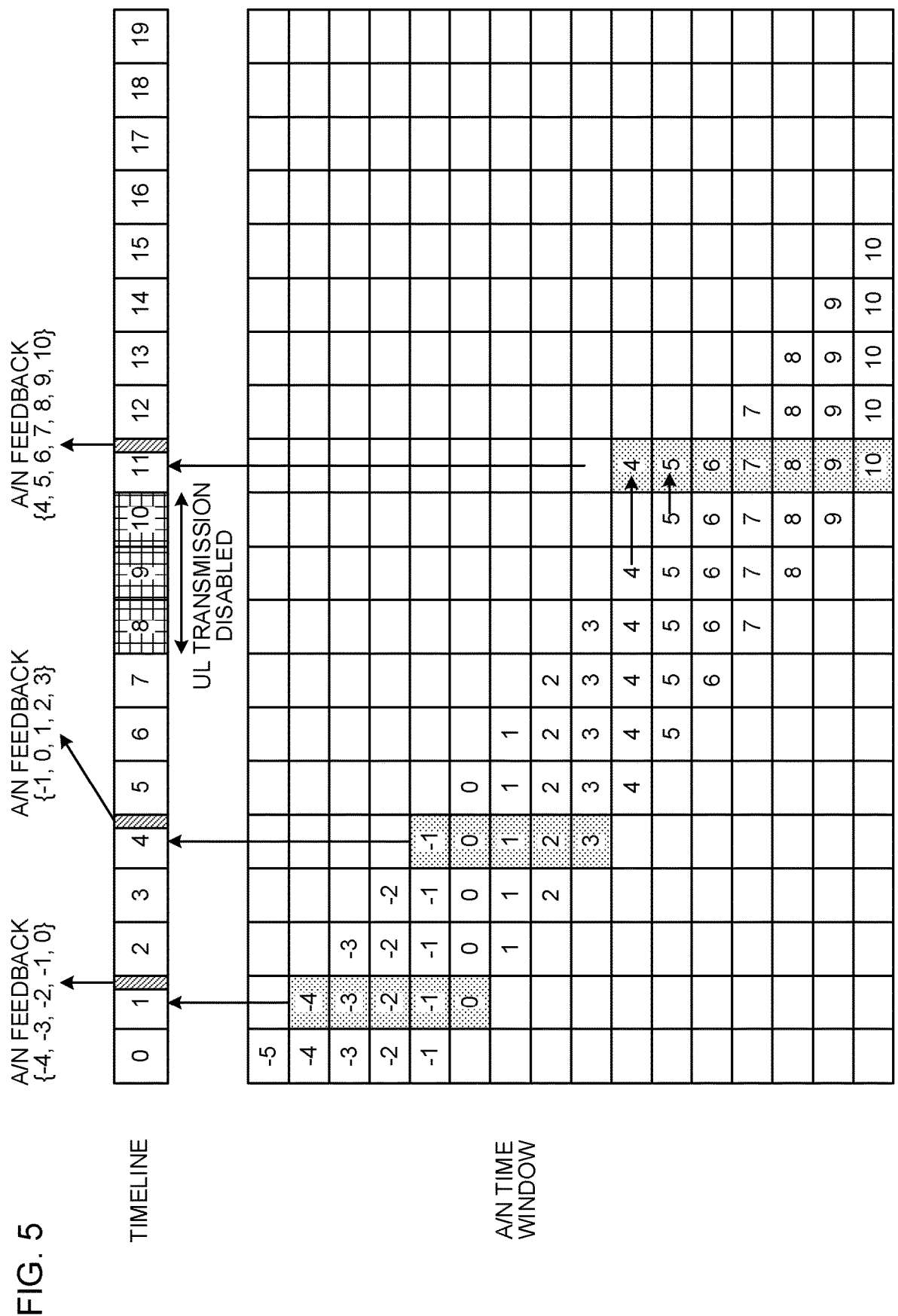
FIG. 5 is a diagram to show another example of A/N feedback control utilizing time windows configured for respective A/Ns.

FIG. 5 shows a case in which, in slots #8 to #10, the UL transmission is restricted for a certain reason (for example, LBT busy). In FIG. 5, no A/N transmission timing is included within the time window range configured for the A/Ns for the DL data transmitted in slots #4 and #5. This precludes the UE from transmitting the A/Ns for the DL data transmitted in slots #4 and #5, within the time window.

In such a case, control is provided such that the A/Ns for the DL data transmitted in slots #4 and #5 are transmitted at an A/N timing configured at the earliest timing (here, slot #11) after the elapse of the time window. Here, slot #11 is included in the time window for the A/Ns for the DL data in slots #6 to #10, and thus, the A/Ns for the DL data in slots #4 and #5 are transmitted in addition to the A/Ns for the DL data in slots #6 to #10. This case may be understood as that the time windows for the A/Ns for the DL data in slots #4 and #5 are extended.

Thus, in a case where the A/N fails to be transmitted in the configured time window, the A/N transmission is performed by utilizing the A/N transmission timing after the time window. This allows appropriate transmission of the A/N, enabling suppression of degradation of communication quality.

(Radio Communication System)

Hereinafter, a structure of a radio communication system according to the present embodiment will be described. In this radio communication system, the radio communication method according to each of the above-described aspects is adopted. Note that the radio communication methods according to the above-described aspects may be adopted independently or in combination.

Figure 6:
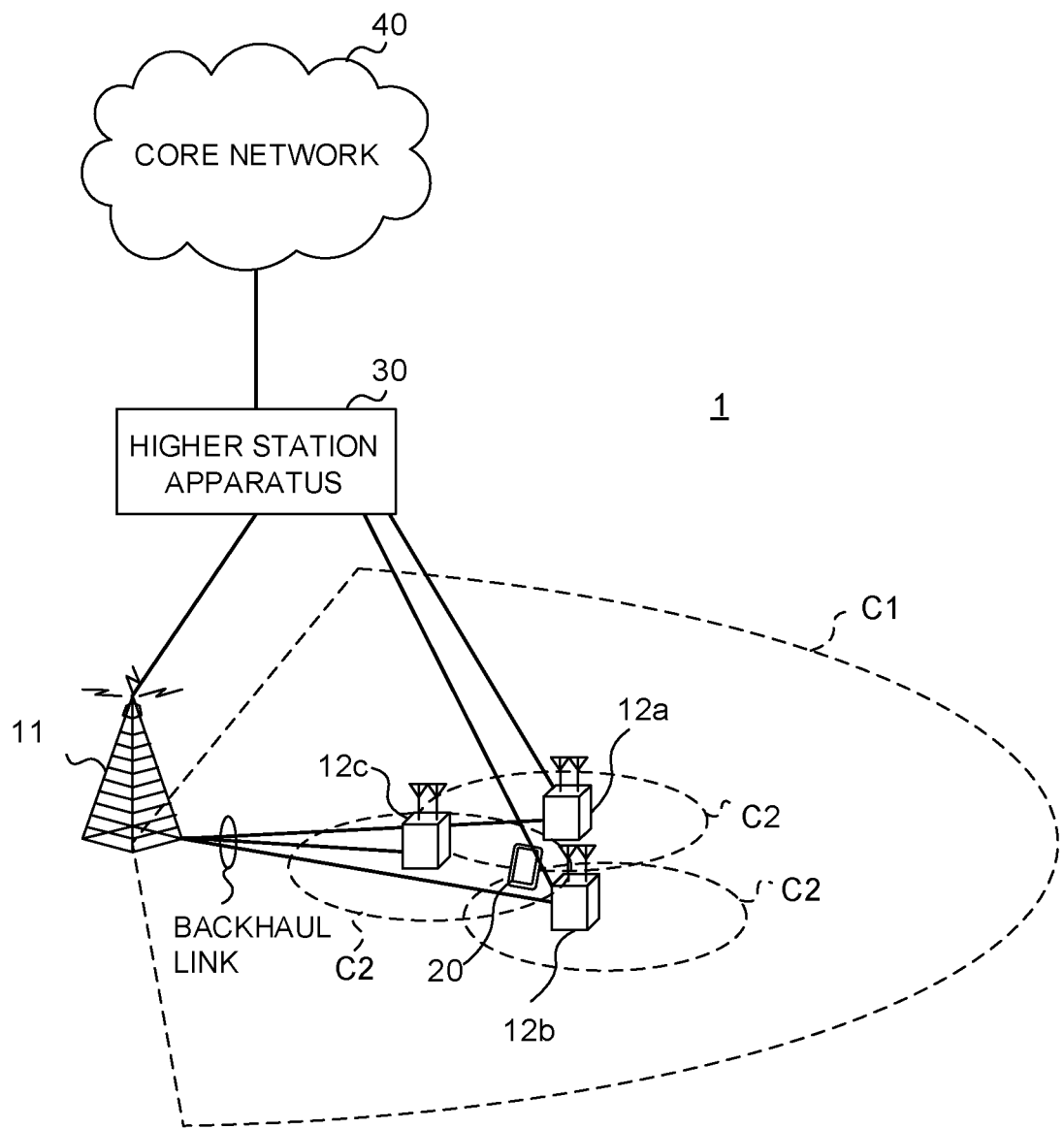
FIG. 6 is a diagram to show an example of a schematic structure of a radio communication system according to the present embodiment.

FIG. 6 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit. Note that the radio communication system 1 may also be referred to as SUPER 3G, LTE-A (LTE-Advanced), IMT-Advanced, 4G, 5G, FRA (Future Radio Access), NR (New RAT), and so on.

The radio communication system 1 shown in FIG. 6 includes a radio base station 11 that forms a macro cell C1, and radio base stations 12*a* to 12*c* that form small cells C2, which are placed within the macro cell C1 and which are narrower than the macro cell C1. Also, user terminals 20 are placed in the macro cell C1 and in each small cell C2. Different numerologies may be applied to respective cells.

Note that the numerology refers to a set of communication parameters characterizing design of signals in a certain RAT and/or design of the RAT.

The user terminals 20 can connect with both the radio base station 11 and the radio base stations 12. It is assumed that the user terminals 20 use the macro cell C1 and the small cells C2 at the same time by means of CA or DC, the macro cell C1 and the small cells C2 using different frequencies. The user terminals 20 may adopt CA or DC by using a plurality of cells (CCs) (for example, two or more CCs). The user terminal can use a licensed band CC and an unlicensed band CC as the plurality of cells.

The user terminals 20 can perform communication by using time division duplex (TDD) or frequency division duplex (FDD) in each cell. A TDD cell and an FDD cell may respectively be referred to as a TDD carrier (frame structure type 2), FDD carrier (frame structure type 1), and so on.

Each cell (carrier) may adopt one of a subframe having a relatively time length (for example, 1 ms) (also referred to as a TTI, a normal TTI, a long TTI, a normal subframe, a long subframe, a slot, and so on) or a subframe having a relatively short duration (also referred to as a short TTI, a short subframe, a slot, and so on) or may adopt both the long subframe and the short subframe. Each cell may adopt a subframe with two or more time lengths.

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, an optical fiber in compliance with the CPRI (Common Public Radio Interface), an X2 interface, and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may include, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals but stationary communication terminals. The user terminal 20 can make device-to-device communication (D2D) with another user terminal 20.

In the radio communication system 1, as radio access schemes, OFDMA (orthogonal frequency division multiple access) can be applied to the downlink (DL), and SC-FDMA (single carrier frequency division multiple access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and the UL may use OFDMA. SC-FDMA can be applied to a sidelink (SL) used for device-to-device communication.

In the radio communication system 1, a DL data channel (also referred to as PDSCH (Physical Downlink Shared Channel, DL shared channel, and so on), which is used by each user terminal 20 on a shared basis, a broadcast channel (PBCH (Physical Broadcast Channel)), L1/L2 control channels and so on, are used as DL channels. At least one of user data, higher layer control information, SIBs (System Information Blocks) and so on are communicated on the PDSCH. MIBs (Master Information Blocks) are communicated on the PBCH.

The L1/L2 control channels include a DL control channel (for example, PDCCH (Physical Downlink Control Channel) and/or an EPDCCH (Enhanced Physical Downlink Control Channel)), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH and/or the EPDCCH. The number of OFDM symbols to use for the PDCCH is communicated on the PCFICH. The EPDCCH is frequency-division multiplexed with the PDSCH and used to communicate DCI and so on, like the PDCCH. At least one of the PHICH, the PDCCH, and the EPDCCH can be used to transmit PUSCH transmission confirmation information (A/N and HARQ-ACK).

In the radio communication system 1, a UL data channel (PUSCH (Physical Uplink Shared Channel), UL shared channel, or the like), which is used by each user terminal 20 on a shared basis, a UL control channel (PUCCH (Physical Uplink Control Channel)), a random access channel (PRACH (Physical Random Access Channel)) and so on are used as UL channels. User data, higher layer control information and so on are communicated on the PUSCH. Uplink control information (UCI) including at least one of transmission conformation information (A/N, HARQ-ACK) and channel state information (CSI) about the PDSCH is communicated on the PUSCH or the PUCCH. By means of the PRACH, random access preambles for establishing connections with cells can be communicated.

<Radio Base Station>

Figure 7:
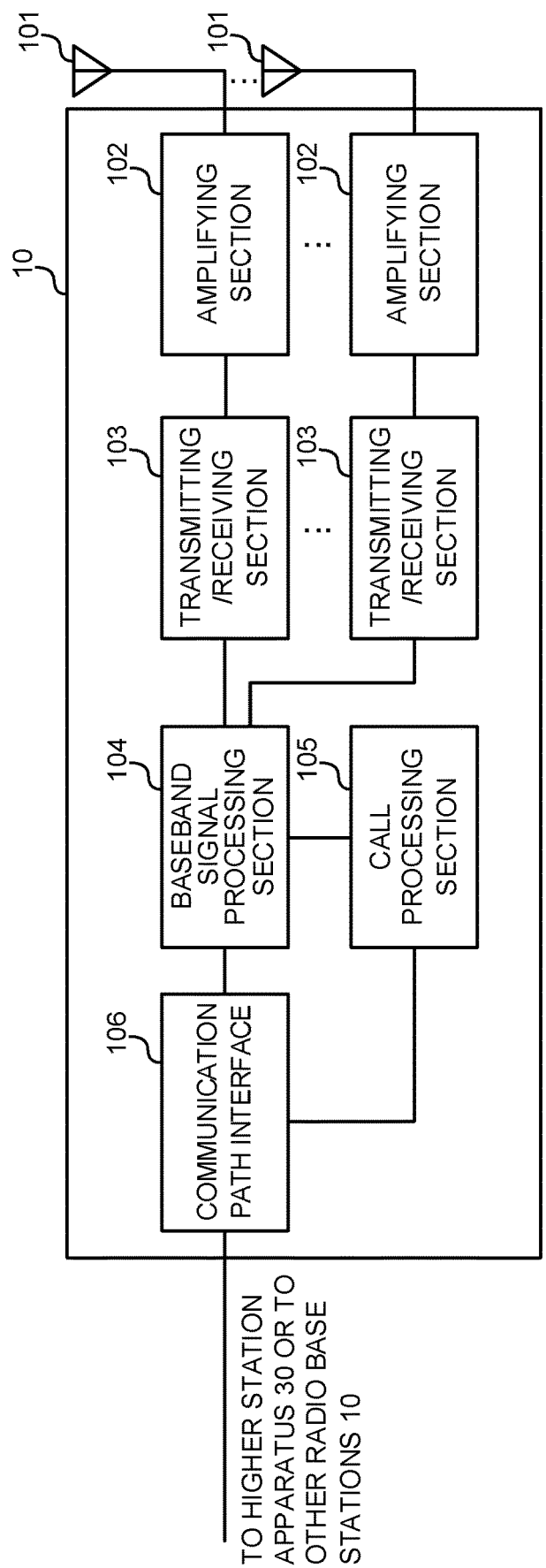
FIG. 7 is a diagram to show an example of an overall structure of a radio base station according to the present embodiment.

FIG. 7 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as at least one of a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process, and a precoding process, and the result is forwarded to each transmitting/receiving section 103. Downlink control signals are also subjected to transmission processes such as channel coding and/or inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, for UL signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 convert the received signals into the baseband signal through frequency conversion and outputs to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs at least one of call processing such as setting up and releasing for communication channels, state management of the radio base station 10, and radio resource management.

The transmission line interface 106 transmits and/or receives signals to and/or from the higher station apparatus 30 via a certain interface. The transmission line interface 106 may transmit and/or receive signals (backhaul signaling) with adjacent radio base stations 10 via an inter-base station interface (for example, an optical fiber in compliance with the CPRI (Common Public Radio Interface) and an X2 interface).

The transmitting/receiving sections 103 receive retransmission control information for DL transmission. The transmitting/receiving sections 103 transmit, to the user terminal, at least one of information related to the transmission timing for the retransmission control information, information related to the time window (for example, an offset, a size, and so on) configured for the retransmission control information, and information related to a slot structure (for example, the transmission direction of slots and so on).

The transmitting/receiving sections 103 receive one or more pieces of retransmission control information, based on the transmission timing for the retransmission control information and the time window configured for each piece of retransmission control information. The transmitting/receiving sections 103 may report the transmission timing such that at least one transmission timing for the retransmission control information is included within the range of each time window.

Figure 8:
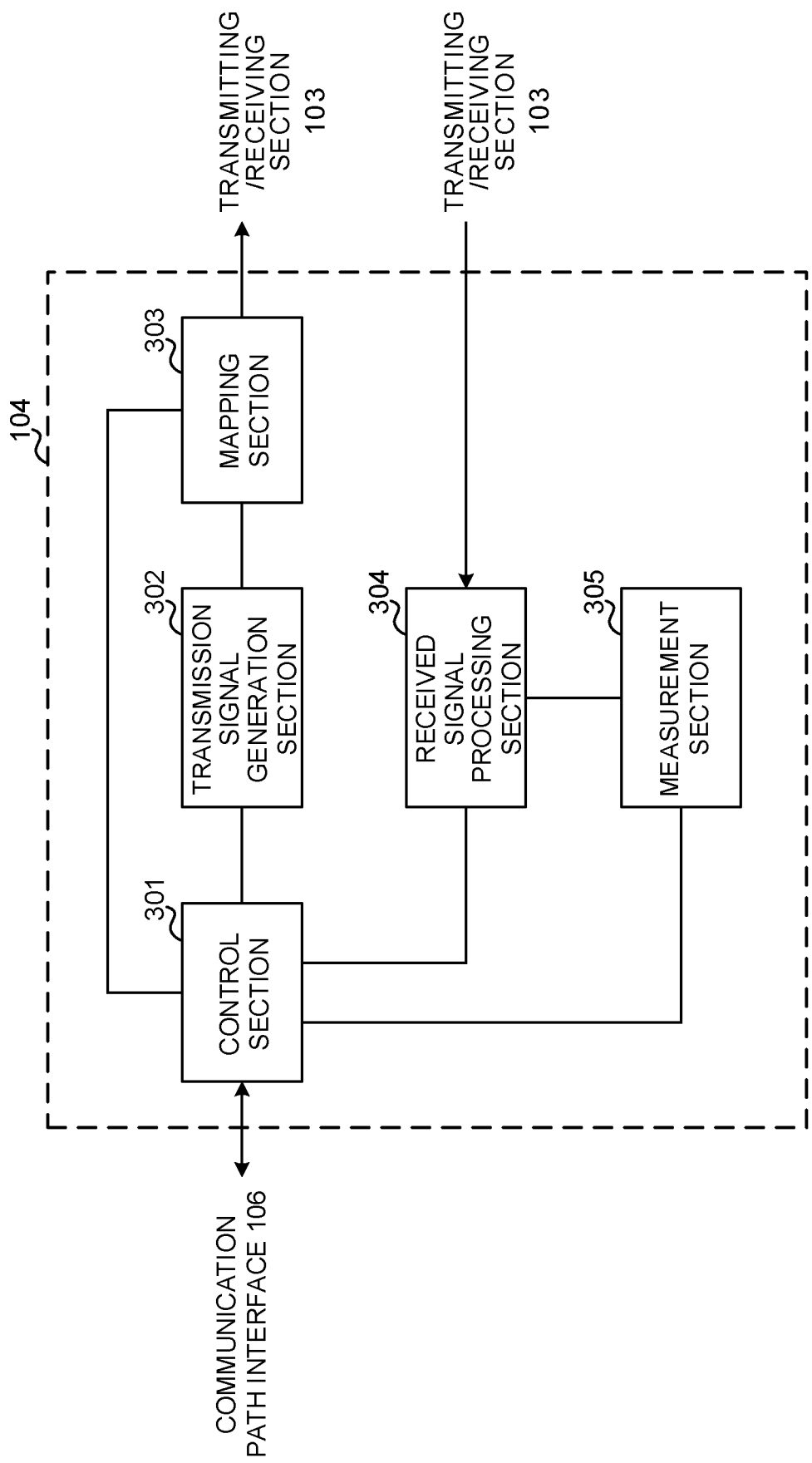
FIG. 8 is a diagram to show an example of a functional structure of the radio base station according to the present embodiment.

FIG. 8 is a diagram to show an example of a functional structure of the radio base station according to the present embodiment. Note that FIG. 8 primarily shows functional blocks that pertain to characteristic parts of the present embodiment, and it is assumed that the radio base station 10 may include other functional blocks that are necessary for radio communication as well. As shown in FIG. 8, the baseband signal processing section 104 at least includes a control section 301, a transmission signal generation section 302, a mapping section 303, a received signal processing section 304, and a measurement section 305.

The control section 301 controls the whole of the radio base station 10. The control section 301 controls at least one of, for example, generation of DL signals by the transmission signal generation section 302, mapping of DL signals by the mapping section 303, a receiving process (for example, demodulation and so on) of UL signals by the received signal processing section 304, and measurements by the measurement section 305.

Specifically, the control section 301 schedules the user terminal 20. For example, the control section 301 controls the transmission timing and/or transmission period for the uplink shared channel and the transmission timing/transmission period for the uplink control information. The control section 301 controls the configuration (DL transmission, UL transmission, and so on) of each slot.

In a case where time windows are configured for the retransmission control information, the control section 301 controls the reception of the retransmission control information, based on certain timings and the time windows configured for the retransmission control information. The control section 301 may control reporting of the certain timings such that at least one certain timing is included within the range of each time window.

The control section 301 can be constituted with a controller, a control circuit or control apparatus that can be described based on general understanding of the technical field to which the present invention pertains.

The transmission signal generation section 302 generates DL signals (DL control signals, DL data signals, DL reference signals and so on) based on commands from the control section 301 and outputs the DL signals to the mapping section 303.

The transmission signal generation section 302 can be a signal generator, a signal generation circuit or signal generation apparatus that can be described based on general understanding of the technical field to which the present invention pertains.

The mapping section 303 maps the DL signals generated in the transmission signal generation section 302 to certain radio resources, based on commands from the control section 301, and outputs these to the transmitting/receiving sections 103. The mapping section 303 can be a mapper, a mapping circuit or mapping apparatus that can be described based on general understanding of the technical field to which the present invention pertains.

The received signal processing section 304 performs a receiving process (for example, demapping, demodulation, decoding and so on) on UL signals (including, for example, UL data signals, UL control signals, UL reference signals) transmitted from the user terminal 20. Specifically, the received signal processing section 304 may output the received signals and/or the signals resulting from the receiving processes to the measurement section 305. The received signal processing section 304 performs a UCI receiving process, based on a UL control channel configuration indicated by the control section 301.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may measure UL channel quality, based on the received power (for example, RSRP (Reference Signal Received Power)) and/or received quality (for example, RSRQ (Reference Signal Received Quality)) of UL reference signals. The measurement results may be output to the control section 301.

<User Terminal>

Figure 9:
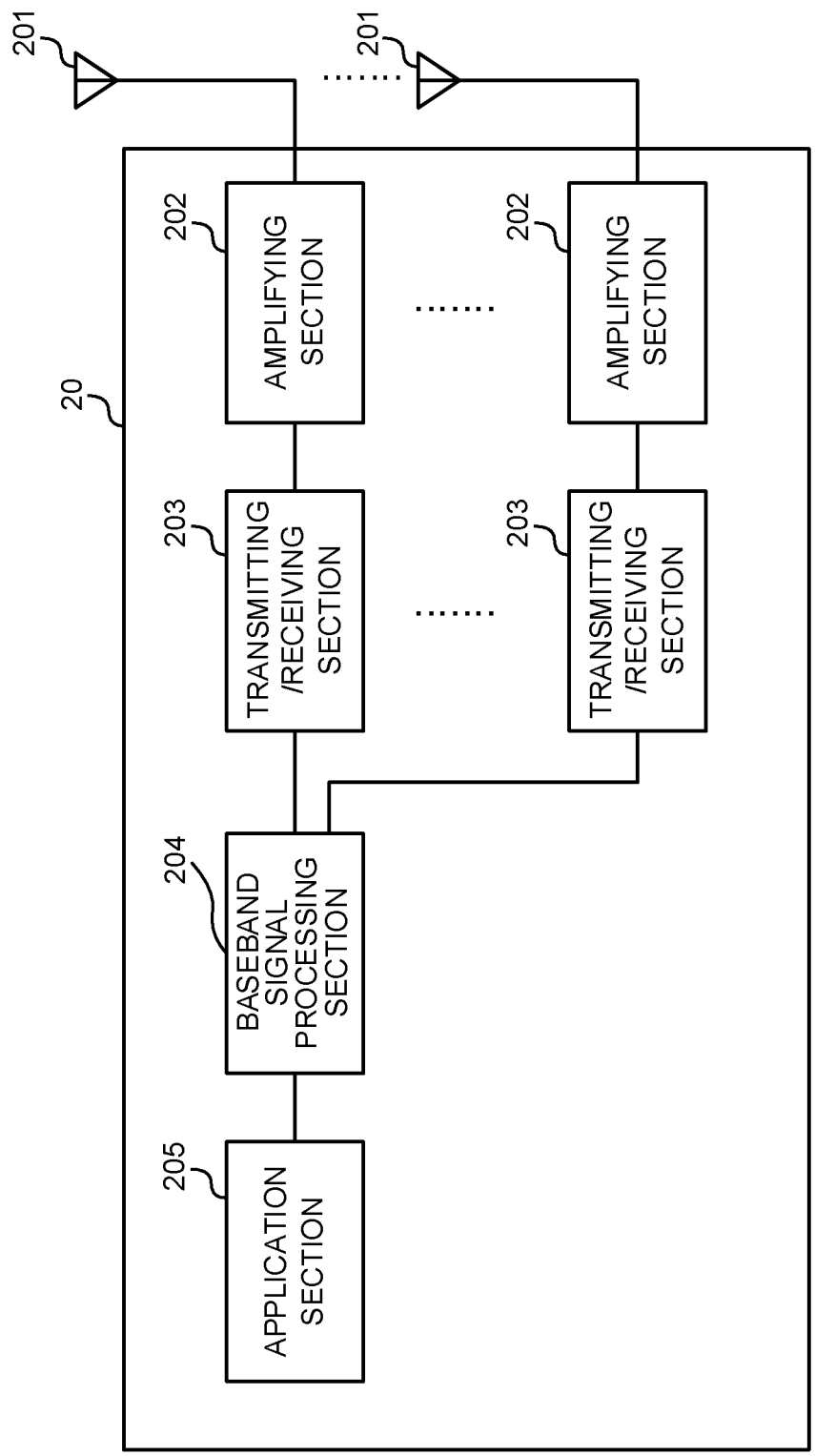
FIG. 9 is a diagram to show an example of an overall structure of a user terminal according to the present embodiment.

FIG. 9 is a diagram to show an example of an overall structure of a user terminal according to the present embodiment. A user terminal 20 includes a plurality of transmitting/receiving antennas 201 for MIMO transmission, amplifying sections 202, transmitting/receiving sections 203, a baseband signal processing section 204 and an application section 205.

Radio frequency signals received in the plurality of transmitting/receiving antennas 201 are amplified in the respective amplifying sections 202. The transmitting/receiving sections 203 receive the DL signals amplified in the amplifying sections 202. The transmitting/receiving sections 203 convert the received signals into baseband signals through frequency conversion, and output the baseband signals to the baseband signal processing section 204.

The baseband signal processing section 204 performs, on the input baseband signals, at least one of an FFT process, error correction decoding, a retransmission control receiving process, and so on. The DL data is forwarded to the application section 205. The application section 205 performs processes related to higher layers above the physical layer and the MAC layer, and so on.

Meanwhile, the UL data is input from the application section 205 to the baseband signal processing section 204. The baseband signal processing section 204 performs at least one of a retransmission control process (for example, an HARQ process), channel coding, rate matching, puncture, a discrete Fourier transform (DFT) process, an IFFT process, and so on, and the result is forwarded to the transmitting/receiving section 203. At least one of channel coding, rate matching, puncture, a DFT process, an IFFT process, and so on is also applied on the UCI (for example, at least one of an A/N for a DL signal, channel state information (CSI), and a scheduling request (SR) and so on), and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 transmit retransmission control information for DL transmission (for example, the DL data and PDSCH). The transmitting/receiving sections 203 receive at least one of information related to the transmission timing for the retransmission control information, information related to the time window (for example, an offset, a size, and so on) configured for the retransmission control information, and information related to a slot structure (for example, the transmission direction of slots and so on).

The transmitting/receiving sections 203 transmit one or more pieces of retransmission control information, based on the transmission timing for the retransmission control information and the time window configured for each piece of retransmission control information. The transmitting/receiving sections 203 may control the UL transmission (for example, the A/N transmission) on the assumption that at least one transmission timing for the retransmission control information is included within the range of each time window.

The transmitting/receiving sections 203 can be transmitters/receivers, transmitting/receiving circuits or transmitting/receiving apparatus that can be described based on general understanding of the technical field to which the present invention pertains. Each transmitting/receiving section 203 may be structured as a transmitting/receiving section in one entity, or may be constituted with a transmitting section and a receiving section.

Figure 10:
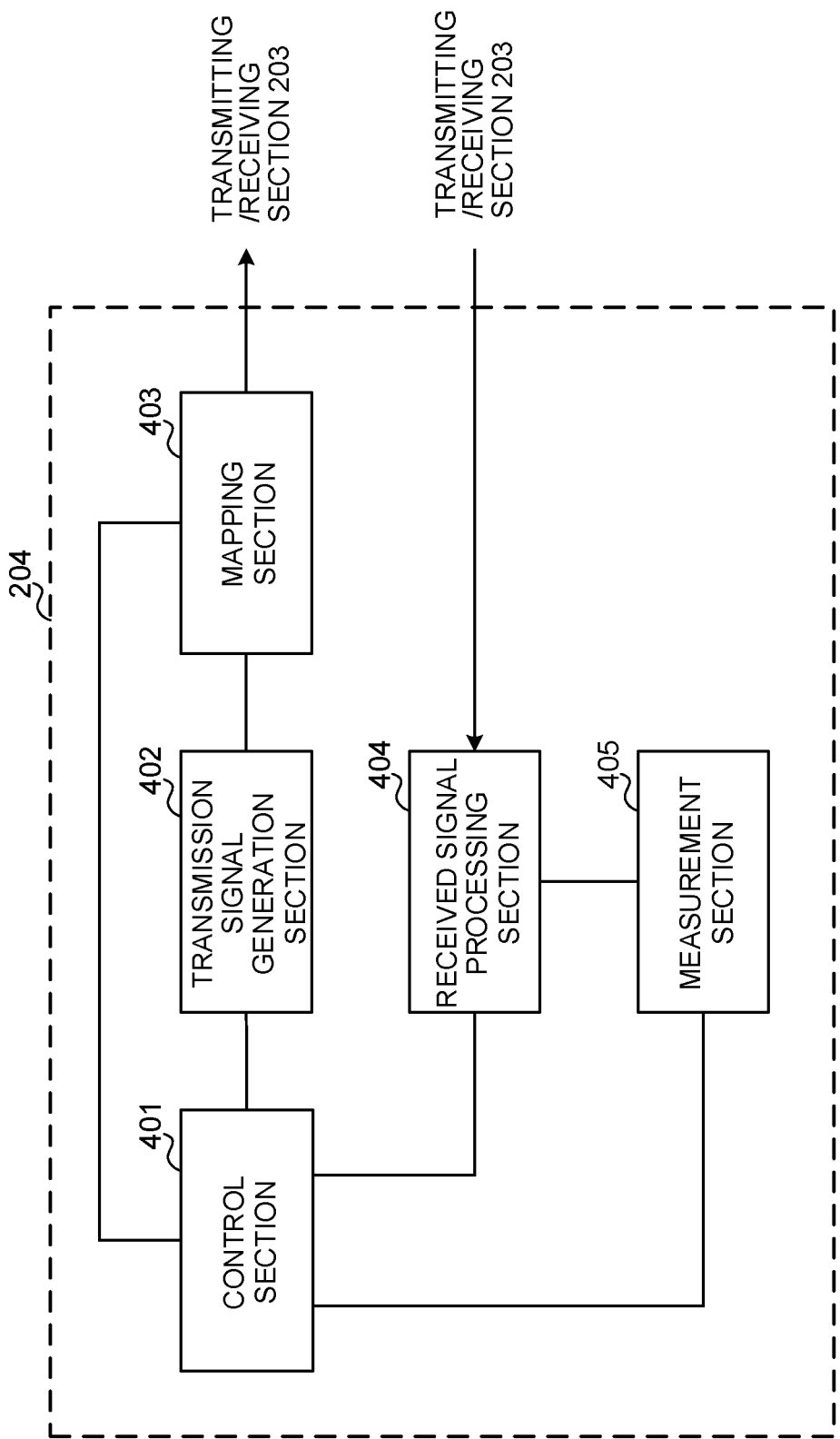
FIG. 10 is a diagram to show an example of a functional structure of the user terminal according to the present embodiment.

FIG. 10 is a diagram to show an example of a functional structure of a user terminal according to the present embodiment. Note that FIG. 10 primarily shows functional blocks of characteristic parts of the present embodiment, and it is assumed that the user terminal 20 may include other functional blocks that are necessary for radio communication as well. As shown in FIG. 10, the baseband signal processing section 204 provided in the user terminal 20 at least includes a control section 401, a transmission signal generation section 402, a mapping section 403, a received signal processing section 404 and a measurement section 405.

The control section 401 controls the whole of the user terminal 20. The control section 401 controls at least one of, for example, generation of UL signals by the transmission signal generation section 402, mapping of UL signals by the mapping section 403, a receiving process of DL signals by the received signal processing section 404, and measurements by the measurement section 405.

The control section 401 controls the transmission of the retransmission control information at certain timings reported from the base station (or configured in advance). For example, in a case where time windows are configured for the retransmission control information for the DL transmission, the control section 401 controls the transmission of one or more pieces of retransmission control information, based on the certain timings and the time windows configured for the retransmission control information (see FIGS. 1 to 3). The control section 401 may control the UL transmission on the assumption that at least one certain timing is included within the range of the time window.

In a case where a plurality of certain timings are included in the time window, the control section 401 may provide control to transmit, at intervals of a plurality of certain timings, the retransmission control information constituting the time window (see FIG. 4).

The control section 401 controls the codebook size of the retransmission control information transmitted at certain timings, regardless of whether the DL transmission is scheduled. Alternatively, the control section 401 may control the codebook size of the retransmission control information transmitted at certain timings, based on whether the DL transmission is scheduled.

In a case where the retransmission control information for a plurality of DL transmissions is transmitted at certain timings, the control section 401 controls the multiplexing position of the pieces of retransmission control information according to a time unit number at which each DL transmission is performed or the transmission order of the DL transmissions.

In a case where the retransmission control information fails to be transmitted within the range of the time window, the control section 401 may provide control to perform the transmission at the earliest timing when the retransmission control information is transmitted after the time window (see FIG. 5).

The control section 401 can be constituted with a controller, a control circuit or control apparatus that can be described based on general understanding of the technical field to which the present invention pertains.

The transmission signal generation section 402 generates (for example, performs coding, rate matching, puncture, modulation, and so on) UL signals (UL data signals, UL control signals, UL reference signals, UCI, and so on), based on commands from the control section 401 and outputs the UL signals to the mapping section 403. The transmission signal generation section 402 can be a signal generator, a signal generation circuit or signal generation apparatus that can be described based on general understanding of the technical field to which the present invention pertains.

The mapping section 403 maps the UL signals generated in the transmission signal generation section 402 to radio resources, based on commands from the control section 401, and outputs the result to the transmitting/receiving sections 203. The mapping section 403 can be a mapper, a mapping circuit or mapping apparatus that can be described based on general understanding of the technical field to which the present invention pertains.

The received signal processing section 404 performs receiving processes (for example, demapping, demodulation, decoding and so on) on DL signals (DL data signals, scheduling information, DL control signals, and DL reference signals). The received signal processing section 404 outputs, to the control section 401, the information received from the radio base station 10. The received signal processing section 404 outputs, to the control section 401, for example, broadcast information, system information, higher layer control information obtained through higher layer signaling such as RRC signaling, physical layer control information (L1/L2 control information), and so on.

The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The measurement section 405 measures the channel state, based on reference signals (for example, CSI-RSs) from the radio base station 10, and outputs the measurement result to the control section 401. Note that the measurements of the channel state may be performed on each CC.

The measurement section 405 can be constituted with a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
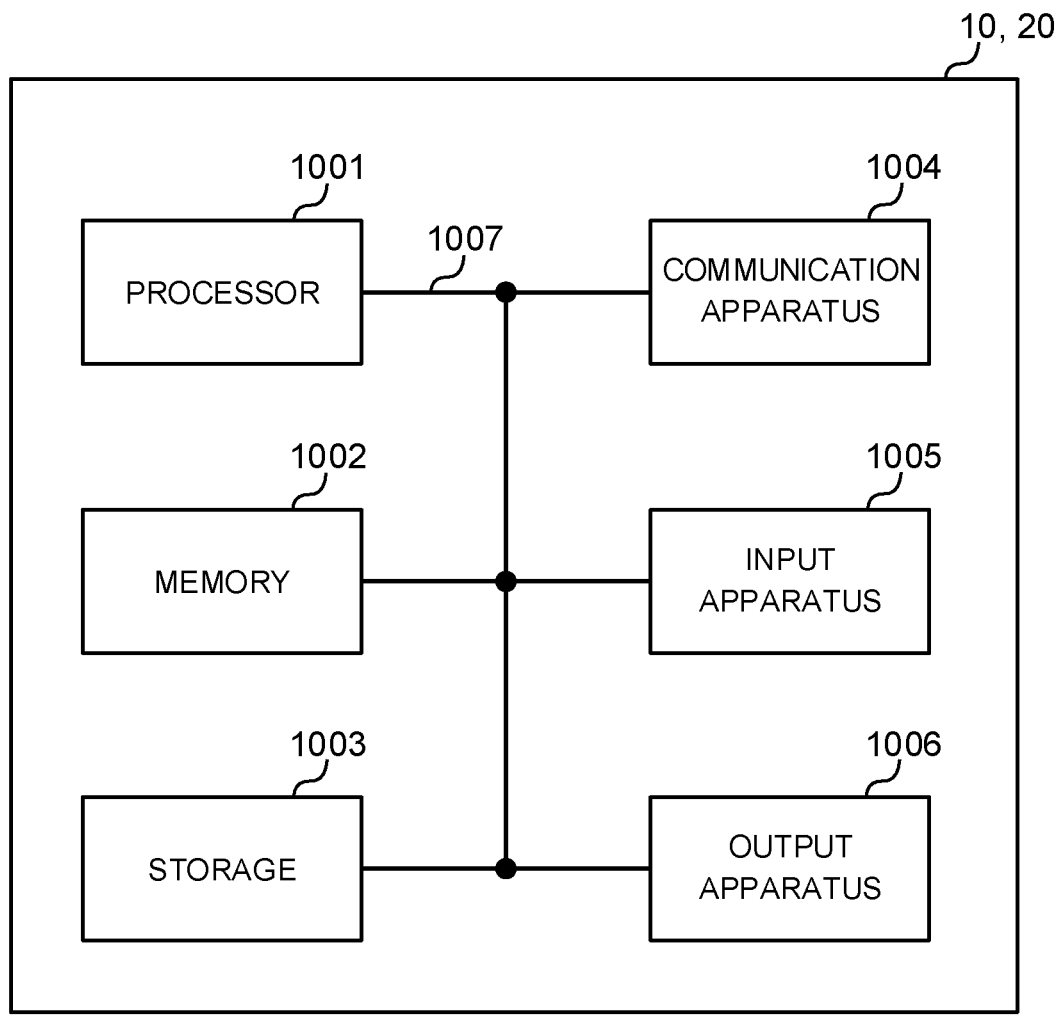
FIG. 11 is a diagram to show an example of a hardware structure of the radio base station and the user terminal according to the present embodiment.

For example, a radio base station, a user terminal, and so on according to the present embodiment may function as a computer that executes the processes of the radio communication method of the present invention. FIG. 11 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
a receiver that receives a downlink shared channel that is scheduled by a downlink control information; and
a processor that generates bits of a HARQ-ACK based on information indicating a plurality of slots that are transmission timing candidates of the HARQ-ACK for the downlink shared channel, information regarding a slot configuration indicating a transmission direction of each slot, and information regarding a transmission timing of the HARQ-ACK notified by the downlink control information, and controls to transmit the HARQ-ACK in a slot that is determined based on the information regarding the transmission timing of the HARQ-ACK,
wherein the determined slot is at least one of the plurality of slots that are the transmission timing candidates.

2. The terminal according to claim 1, wherein the receiver receives, via higher layer signaling, the information indicating the plurality of slots that are the transmission timing candidates.

3. A radio communication method comprising:
receiving a downlink shared channel that is scheduled by a downlink control information;
generating bits of a HARQ-ACK based on information indicating a plurality of slots that are transmission timing candidates of the HARQ-ACK for the downlink shared channel, information regarding a slot configuration indicating a transmission direction of each slot, and information regarding a transmission timing of the HARQ-ACK notified by the downlink control information; and
controlling to transmit the HARQ-ACK in a slot that is determined based on the information regarding the transmission timing of the HARQ-ACK,
wherein the determined slot is at least one of the plurality of slots that are the transmission timing candidates.

4. A base station comprising:
a transmitter that transmits a downlink control information that schedules a downlink shared channel; and
a processor that controls reception of a HARQ-ACK whose bits are generated by a terminal based on information indicating a plurality of slots that are transmission timing candidates of the HARQ-ACK for the downlink shared channel, information regarding a slot configuration indicating a transmission direction of each slot, and information regarding a transmission timing of the HARQ-ACK notified by the downlink control information, the HARQ-ACK being transmitted from the terminal in a slot that is determined by the terminal based on the information regarding the transmission timing of the HARQ-ACK,
wherein the determined slot is at least one of the plurality of slots that are the transmission timing candidates.

5. A system comprising a terminal and a base station, wherein:
the terminal comprises:
a receiver that receives a downlink shared channel that is scheduled by a downlink control information; and
a processor that generates bits of a HARQ-ACK based on information indicating a plurality of slots that are transmission timing candidates of the HARQ-ACK for the downlink shared channel, information regarding a slot configuration indicating a transmission direction of each slot, and information regarding a transmission timing of the HARQ-ACK notified by the downlink control information, and controls to transmit the HARQ-ACK in a slot that is determined based on the information regarding the transmission timing of the HARQ-ACK, and
the base station comprises:
a transmitter that transmits the downlink control information,
wherein the determined slot is at least one of the slots that are the plurality of transmission timing candidates.

* * * * *